June 6, 1933.   A. J. FERGUSON   1,913,155
ELECTRIC POTENTIAL INDICATOR
Filed Nov. 18, 1929   2 Sheets-Sheet 1
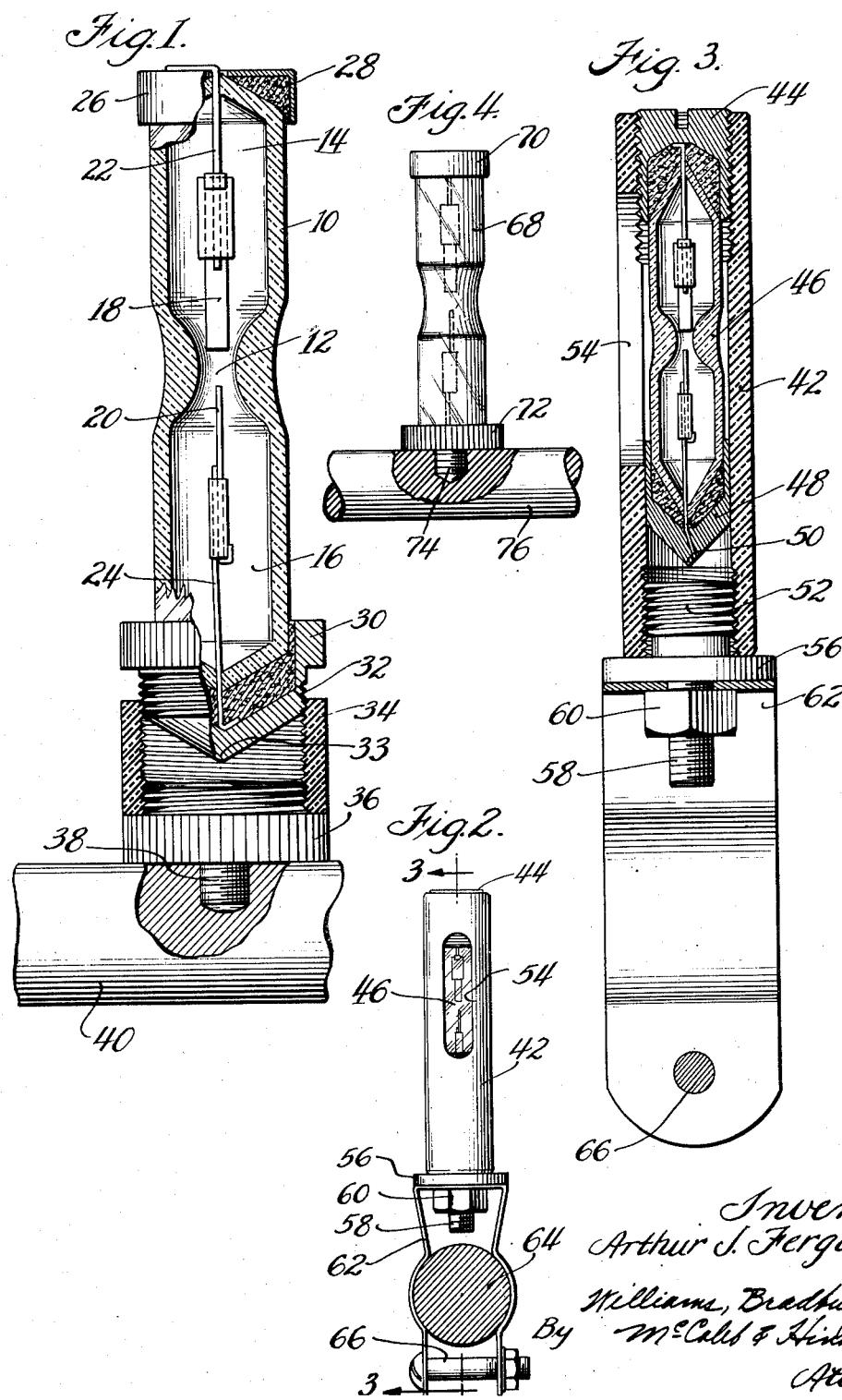

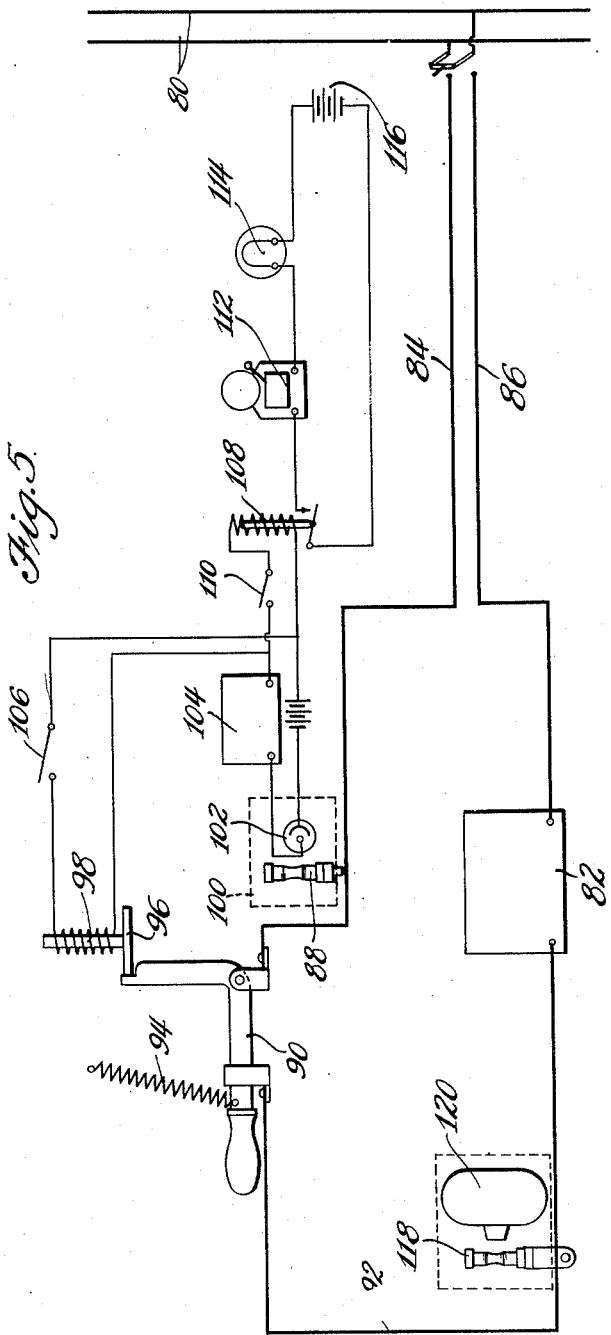

Patented June 6, 1933

1,913,155

UNITED STATES PATENT OFFICE

ARTHUR J. FERGUSON, OF WINNETKA, ILLINOIS, ASSIGNOR TO MINERALLAC ELECTRIC COMPANY, OF CHICAGO, ILLINOIS, A CORPORATION OF ILLINOIS

ELECTRIC POTENTIAL INDICATOR

Application filed November 18, 1929. Serial No. 407,861.

My invention relates generally to electric potential indicators and more particularly to devices for indicating the presence or absence of an electrical potential and differences in electrical potential. As ancillary and corollary to the potential indicating function of the device of my invention, the device may be used (1) as a constant indicator of whether or not a conductor is live, (2) as an approximate indicator of the potential or voltage of the current in a conductor, (3) as an indicator of incipient breakdown of insulation in electrical conductors or machinery, (4) as an indicator of phase or frequency differences in different conductors, and (5) as a control means for circuit breakers, etc.

It is an object of my invention to provide an improved means for indicating the presence or absence of electrical potential.

A further object is to provide an improved electrical potential indicating device which will indicate surges and other irregularities in electrical conductors.

A further object is to provide an improved method and means for indicating incipient breakdown of the insulation of conductors used as power transmission lines or as parts of electrical devices and machines.

A further object is to provide improved means for controlling the operation of a circuit breaker so as to open the circuit to an electrical conductor or machine as soon as the insulation starts to break down, and before the complete breakdown occurs.

A further object is to provide an improved means for testing insulation.

A further object is to provide an improved means and method for indicating phase and frequency differences.

Other objects will appear from the following description, reference being had to the accompanying drawings, in which Fig. 1 is a vertical cross-sectional view showing my device secured to a conductor;

Fig. 2 is an elevational view of a slightly modified form thereof;

Fig. 3 is a central vertical sectional view taken on the line 3—3 of Fig. 2;

Fig. 4 is an elevation of a second modified form;

Fig. 5 is a wiring diagram showing a system for interrupting current flow to electrical apparatus prior to the complete breakdown of the insulation thereof; and Fig. 6 is a somewhat diagrammatic illustration of the method of using my device for detecting differences of phase and frequency.

My invention contemplates the use of a tube filled with a rarefied gas, such as neon or other gas having similar properties, as an indicator of the presence or absence of current potentials. Broadly, this use of a gas filled tube is not new, such tubes having been used in the past for detecting ignition troubles in internal combustion engines and for other similar purposes. My invention resides in the provision of an improved form of device of this kind and in the provision of improved methods and apparatus for extending the utility and functions of the device.

As shown in Fig. 1, the device comprises a substantially cylindrical closed end tube 10 forming a chamber comprising a central restricted portion 12 and two slightly enlarged end portions 14 and 16. A pair of electrodes 18, 20 is suitably secured to lead-in wires 22, 24 which are hermetically sealed in the ends of the tube. The outer end of the lead-in wire 22 is soldered or otherwise suitably secured to a cap 26 which fits over the upper end of the tube and it is secured thereto by cement 28. The lead-in wire 24 is secured in electrical contact with a cup-shaped member 30 forming a cap for the lower end of the tube 10 and which has external threads 32 formed thereon. The member 30 has a substantially conical lower end portion terminating in a point 33. The cup 30 is screwed into an internally threaded sleeve 34 made out of a dielectric substance such as a phenol condensation product or hard rubber. A plug 36 is screwed into the lower end of the sleeve 34 and has a threaded projection 38 of smaller diameter which is adapted to be screwed into an electrical conductor 40. A gap is thus formed between the flat upper surface of the plug 36 and the point 33. The metallic parts of the device are preferably, but not essentially, made of a metal non-oxidizable at normal temperature.

In Figs. 2 and 3, I have shown a similar device which comprises a tubular barrel 42, the ends of which are internally threaded to receive the upper cap 44. The tube 46 is suitably secured to this cap and is in electrical contact with one of the electrodes thereof. The tube 46 may be of the same general construction as the tube 10 previously described, having a somewhat similar lower end cap 48 to which the other electrode of the tube is secured and which has a point 50 adapted to form one element of a spark gap, the other element of which is formed by a plug 52 threaded in the barrel 42. The barrel 42 has a suitable sight opening 54 through which the whole length of the tube may be observed. The plug 52 has a flange 56 and a threaded shank 58 upon which a nut 60 is screwed for securing the device to a clamp 62.

The clamp is adapted to be attached to a conductor 64 by means of a bolt 66. In this embodiment it will be apparent that the distance between the point 50 of the lower end cap 48 and the upper surface of the plug 52 may readily be adjusted by screwing the cap 44 relative to the barrel 42.

In Fig. 4 I have shown a second modification in which a tube 68, of the same type as previously described, has an upper cap 70 and lower cap 72, the latter having a threaded extension 74 for direct attachment to a conductor 76. The device shown in Fig. 4 is thus substantially similar to that shown in Fig. 1 except that it does not have the spark gap.

As above mentioned, one of the objects of my invention is to provide a means to indicate incipient break-down of insulation in the electrical apparatus. It is a well-known fact that failures in electrical systems are not usually instantaneous but are caused by the accumulation of a number of progressive minor defects which eventually result in the total destruction of the insulating medium. These progressive defects sometimes take several months or longer to reach the actual breakdown point where they will be noticed.

To guard against the possibility of early breakdown of insulation, according to one method in common use, the electrical conductors are tested by passing a current of double normal voltage, plus 1,000 volts, through the conductor, and are approved if the insulation does not break down or leak appreciably at this testing voltage. This method of testing overstresses any slightly weak spots in the insulation and accelerates their breakdown, and thus, while it detects the weak spots, it at the same time further weakens other portions of the insulation which ordinarily would maintain proper insulation throughout the normal life of the conductor. In addition, by this method of testing, even though the insulation does not actually break down and the conductor and its insulation passes the test, the insulation will not be as good as it was prior to the test due to minor defects which occur as a result of subjecting the conductor to the high voltage and which would not have occurred if the conductor had been used only at the voltage for which it was designed.

I have discovered that with the use of the previously described device the insulation of a conductor may be readily tested for flaws without subjecting the conductor to excessive voltage. With one of the devices installed in the manner shown in Figs. 1, 2 and 3, with the spark gap closed so that the lower cap of the tube is in direct electrical contact with the conductor, the device will serve as a good indicator of flaws in the insulation. A potential equal to the maximum to which the conductor will normally be subjected is impressed upon the conductor. This will cause the gas in the restricted portion 12 of the tube to glow since the cap at the outer end of the tube has the ability to receive and hold an electrical charge.

For example, as the potential of the lower cap 30 builds up from zero to the maximum potential, the upper cap 26 and electrode 18 will remain at zero potential until the difference in potential between the two caps and their connected electrodes is sufficient to cause ionization of the gas in the restricted portion 12 between the ends of the two electrodes. When this occurs the gas will be illuminated, and the cap 26 will be charged to approximately the same potential as the lower cap 30. Thereafter, as the potential in the conductor drops to its maximum negative value the process will be reversed and the gas in the restricted portion of the tube again illuminated. Thus, when the conductor is tested by an alternating current of sufficiently high frequency the restricted portion of the tube will appear to be continuously illuminated, thus indicating that the insulation is of sufficient strength.

Leakage across the insulation, however, is accompanied with a surge in the line and a superimposed high frequency current due to the spark which takes place through the defect. This surge in the current and the superimposed high frequency current illuminates the tube in a manner entirely different from that of the ordinary alternating current. Instead of illuminating merely the restricted portion 12 of the tube the whole tube will be illuminated. This fact may be readily observed by the person making the test and the fault in insulation corrected or the conductor discarded. With this method the insulation is not subjected to excess potential differences but the defects are nevertheless readily detected and the insulation of the conductor which passes this test will be in far better condition than if it had been tested by the methods previously in use.

In testing transmission lines, "flashes" around an insulator, "grounds" through contact with the branches of trees, and other causes of loss of current, with the concomitant danger to workmen and others, are readily detected.

I have provided an improved apparatus for indicating at distance the bright illumination of the tube which takes place when the insulation begins to break down. This apparatus is diagrammatically illustrated in Fig. 5, in which 80 represents a source of current from which power is supplied to an electrical machine or apparatus 82 through conductors 84 and 86. A potential indicating device 88 of the type previously described is secured to the conductor 84. A circuit breaker, illustrated as a knife switch 90, normally is closed and connects the conductor 84 with a wire 92 leading to the apparatus 82.

A tension spring 94 tends to open the switch 90 but is normally prevented from doing so by a latch 96 which is operated by a solenoid 98. The indicator 88 (which is preferably filled with mercury vapor, helium or other gas which when ionized has high actinic characteristics) is enclosed in a light tight box 100 in which is also located a photoelectric cell 102, the target of which is directed toward the tube of the indicator. An amplifier 104 of one or more stages is connected to the photoelectric cell and the cell thus used to control the flow of current either to the solenoid 98, when a switch 106 is closed, or to a relay 108, when a switch 110 is closed, or both switches may be closed and the solenoid and relay thus simultaneously operated.

Energization of the solenoid 98 releases the switch 90 which will break the circuit to the apparatus 82. Energization of the relay 108 closes a signal circuit which includes a bell 112, a lamp 114 and a source of current 116 connected in series. This signal circuit may of course be remotely located for convenient observation. The quantitative relationships are such that substantially complete illumination of the tube in the device 88 will be necessary for operation of the solenoid and relay.

At the same time, or as an alternative, a photographic record of the degree of illumination of a second potential indicating instrument 118, of the type previously disclosed, and connected to the conductor 92, may be made by a camera device 120 which may be equipped with mechanism for continuously or periodically moving the film. From this film record surges in the current and the presence of high frequency current in the conductor may be readily detected and the defect in the apparatus remedied before complete breakdown occurs.

The device as shown in Figs. 1 to 4, may be attached permanently to conductors such as high tension cables, underground cables, bus bars, etc., and, with the spark gap closed, the continuous illumination of the restricted portion will serve as a constant danger signal to the workmen. When thus used solely as an indicator of whether or not a conductor is "live", the device of the simpler construction shown in Fig. 4 may be used, although greater intensity of illumination may be obtained by the use of the spark gap.

When the device employing the spark gap is used the length of the gap is adjusted so that not only the restricted portion of the tube but also the enlarged end portions will be brightly illuminated. The proper length of the spark gap depends upon the voltage and the frequency of the current flowing in the conductor.

The sparking across the gap appears to set up an extremely high frequency discharge which is effective in ionizing and rendering luminous substantially all of the gas in the tube. The amount of illumination of the tube is also dependent in part upon the size of the caps at the ends of the tube, the size of the electrodes, the density of the gas and the kind of gas used.

The device need not necessarily be electrically connected to the conductor but with proper adjustment of the spark gap will operate satisfactorily if held at some distance from the conductor.

The instrument of my invention may also conveniently be used to indicate differences in phase and frequency, and thus aids in the operation of bringing several electrical machines into synchronism. The method of using the instrument for this purpose is illustrated in Fig. 6 in which two conductors 124 and 126 are to be tested for the phase and frequency relationships of the currents flowing through them.

If one of the potential indicating devices 128 constructed as previously described, is held in the position A or B, and thereupon glows, it will indicate the flow of alternating or pulsating direct current in the conductor 126, and, similarly, if it glows when held in the position C it will indicate that conductor 124 is "live", since when held in any one of these positions it is substantially solely affected by the field of the adjacent conductor. If now, however, after it has been discovered that both conductors are carrying a current, the instrument is placed between the two conductors so that its end caps are substantially equidistant from the respectively adjacent conductors, the tube will give different indications, dependent upon the phase and frequency relationships of the potentials in the two conductors.

If both conductors are at the same potential at the same time (in phase) the tube will not glow, since the charges upon each end of the tube will be equal and "balance" each other. If one conductor is carrying a current of a certain frequency and the other conductor carrying a current of a different frequency, the tube will glow each time the currents go out of phase and go out each time the two currents come into phase. A noticeable flickering of the tube will indicate an appreciable difference in frequency, and periodic illumination at noticeable intervals, substantial synchronization. In bringing two two generators into synchronism the switch which connects them would thus be closed only after the flashes in the tube took place at comparatively infrequent intervals, and then only at a time approximately half way between two successive flashes of the tube.

From the above description it will be apparent that I have provided a simple potential indicating device and discovered several different ways of conveniently making use of the device to obtain indications of different electric current characteristics. Many modifications departing from the preceding disclosure may be made without departing from the spirit of my invention. For example, the spark gap may be placed at either end of the tube or spark gaps may be provided at both ends of the tube. I therefore do not wish to limit my invention to the specific constructions shown and described, but what I claim as my invention and desire to secure by Letters Patent is:

1. In a device of the class described, the combination of a tube containing gas under less than atmospheric pressure, metallic caps at the ends of said tube, electrodes connected to said caps and extending into said tube, a dielectric body secured to one of said caps, said cap being isolated therein, and a metallic plug, adapted to be secured to a conductor, threaded in said body, said isolated cap and plug being relatively adjustable in said body so as to provide an adjustable air gap between said cap and the plug.

2. In a device of the class described, the combination of a tube containing a gas under less than atmospheric pressure, electrodes in said tube, one of which is isolated, a metallic member insulated from said tube but mechanically connected therewith, and means for adjusting the distance between said metallic member and said isolated electrode of said tube.

3. In a device of the class described, the combination of a tube filled with neon gas under less than atmospheric pressure, metallic caps secured to the ends of said tube, spaced electrodes within said tube and connected to said caps, a dielectric member secured to one of said caps, said cap being isolated, and a metallic element secured to said dielectric member, said isolated cap and metallic element being relatively adjustable in said dielectric member to provide an adjustable gap between said isolated cap and the metallic element.

4. In a device of the class described, the combination of a neon tube, metallic caps at the ends of said tube, electrodes connected to said caps and extending within said tube, a dielectric body threadedly secured to one of said caps, said cap being isolated, and a metallic member threaded in said body, said isolated cap and said metallic member being relatively adjustable in said dielectric body so as to provide an adjustable air gap between said isolated cap and the metallic member.

5. In a device of the class described, the combination of a neon tube, electrodes in said tube having their inner ends extending in close proximity to one another, one of said electrodes being isolated, a metallic member insulated from said tube but mechanically connected therewith, and means for adjusting the distance between said metallic member and the end of said isolated electrode.

6. In a device of the class described, the combination of a neon tube, metallic caps secured over the ends of said tube, one of said caps being isolated, electrodes within said tube and connected to said caps, the inner ends of said electrodes being adjacent each other, a dielectric member secured to said isolated cap, and a metallic element adjustable in said dielectric member to provide an adjustable air gap between said cap and the metallic element.

7. An electrical potential indicator comprising a neon tube having electrodes therein and adapted to be wholly illuminated by being placed in a high frequency electromagnetic field and adapted to have the portion thereof between said electrodes to be illuminated by being placed in a relatively low frequency electromagnetic field, and means associated with said tube for converting electrical energy received from a relatively low frequency field to electrical energy of a high frequency, whereby said tube may be wholly illuminated when placed in a relatively low frequency field.

8. A tube containing a rarefied gas capable of illumination upon passage of an electric current therethrough, means for illuminating a portion only of the gas in said tube, said means including a pair of electrodes projecting into said tube, and means associated with said tube for causing illumination of all of the gas in said tube, said last named means including a spark gap in the electrical circuit through the tube.

In witness whereof, I hereunto subscribe my name this 15 day of November, 1929.

ARTHUR J. FERGUSON.